United States Patent [19]

Kusumoto et al.

[11] Patent Number: 5,418,603
[45] Date of Patent: May 23, 1995

[54] IMAGE FORMING APPARATUS CAPABLE OF EVALUATING IMAGE FORMING PERFORMANCE

[75] Inventors: Hiroshi Kusumoto; Daisuke Hayashi; Hideki Ishida; Shoichi Kitagawa; Takashi Nagashima; Mitsugu Miyamoto, all of Osaka, Japan

[73] Assignee: Mita Industrial Co., Ltd., Osaka, Japan

[21] Appl. No.: 124,081

[22] Filed: Sep. 20, 1993

[30] Foreign Application Priority Data

Sep. 25, 1992 [JP] Japan .................. 4-256736
Sep. 25, 1992 [JP] Japan .................. 4-256737
Sep. 28, 1992 [JP] Japan .................. 4-258446

[51] Int. Cl.⁶ .............. G03G 15/00; G03G 15/04
[52] U.S. Cl. ................... 355/203; 355/233; 355/243
[58] Field of Search ........... 355/203, 207, 208, 233, 355/317, 243

[56] References Cited

U.S. PATENT DOCUMENTS

| 4,831,420 | 5/1989 | Walsh et al. ............ 355/203 |
| 4,965,634 | 10/1990 | Bando . |
| 5,006,896 | 4/1991 | Koichi et al. . |
| 5,099,279 | 3/1992 | Shimizu .................. 355/208 |
| 5,146,269 | 9/1992 | Shimizu et al. . |

FOREIGN PATENT DOCUMENTS

| 260892 | 3/1988 | European Pat. Off. . |
| 428408 | 5/1991 | European Pat. Off. . |

Primary Examiner—Joan H. Pendegrass
Attorney, Agent, or Firm—Jordan and Hamburg

[57] ABSTRACT

An image forming apparatus includes an original placement portion and a reference original portion outside of the original placement portion, a scanning device capable of selectively scanning either the original placement portion or the reference original portion, an image forming device for forming an image in accordance with the scanning device, a selection device for selecting the scanning of the original placement portion or the scanning of the reference original portion, and a reading device for reading an image of the reference original portion formed by the image forming device to evaluate a performance of the image forming device.

8 Claims, 14 Drawing Sheets

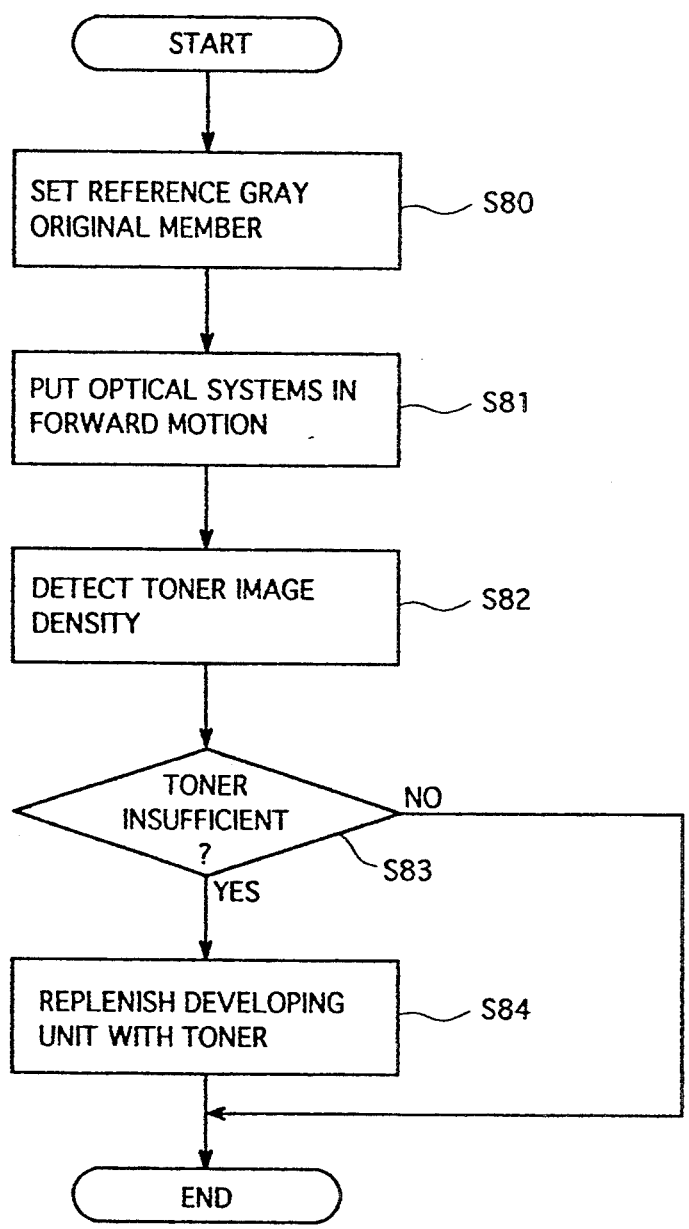

IMAGE FORMING APPARATUS CAPABLE OF EVALUATING IMAGE FORMING PERFORMANCE

BACKGROUND OF THE INVENTION

The present invention relates to an image forming apparatus which can adjust image forming conditions based on reading results of reference original.

For successful reproduction of images, an image forming apparatus such as a copying machine conventionally requires various settings and adjustments. Factors to be set or adjusted include, for example, light intensity of a tungsten halogen lamp, density of reproduced images, life-size magnification, and relative position of a reproduced image with respect to copy paper. These settings and adjustments are performed not only by factory workers during production of image forming apparatuses but also by service personnel whenever required in the field.

In carrying out most of these settings and adjustments, an operator has to make estimates of adjustment values for individual adjustment points based on a reproduced image of a reference original sheet. It is to be noted that these operations are largely guesswork using the trial-and-error method and, therefore, they are time-consuming and require factory workers and field technicians to have sufficient skill to do the job. This fact has so far been a sort of obstacle to improving the working efficiency.

Recently, there have been various approaches for automating the adjustments of image forming apparatuses. In one of such approaches, an image forming apparatus is provided with an optical sensing device on a paper path for reading a reproduced image of a reference original sheet. Based on information derived from reading the reproduced image, the apparatus performs automatic adjustments of image forming conditions, e.g., alteration of set values for specified adjustment points.

It is however a common practice to use a dedicated reference original sheet for each process of the above-mentioned adjustments. Even in the image forming apparatus which performs automatic adjustments, an operator has to manually place dedicated reference original sheets one after another for individual adjustment items. In case the image forming apparatus requires several adjustment processes, it is inevitable to prepare a plurality of reference original sheets and place an appropriate one on an original placement plate prior to each adjustment process. It would be understood that storage and handling of different reference original sheets are cumbersome, especially for service personnel who are required to always carry those reference original sheets with them. This is still far from perfection in automation of the adjustment processes.

Under these circumstances, it is desirable to devise an image forming apparatus which can fully automate a greater part of the adjustment processes, eliminating the need for storing and carrying reference original sheets.

SUMMARY OF THE INVENTION

It is an object of the invention to provide an image forming apparatus which has overcome the above problems.

It is another object of the invention to provide an image forming apparatus which can eliminate the need of placing dedicated reference original sheets on an original placement portion to assure fully automatic adjustments of image forming conditions.

Accordingly, an image forming apparatus of the present invention comprises an original placement portion; reference original means provided at an appropriate position outside of the original placement portion; scanning means capable of selectively scanning either the original placement portion or the reference original means; and image forming means for forming an image based on a result of the scanning means.

With thus constructed image forming apparatus, the necessary can be eliminated of storing dedicated reference original sheets in a special spot, maintenance service man carrying them, or placing them on the original placement portion each adjustment because the reference original means is built in the image forming apparatus.

It may be preferable to further provide selection means for selecting the scanning of the original placement portion or the scanning of the reference original means; and reading means for reading an image of the reference original means formed by the image forming means to evaluate a performance of the image forming means.

With this construction, when evaluating a performance of the image forming means, the reference original means is scanned and an image of the reference original means is read by the reading means. Accordingly, the image forming conditions are manually or automatically adjusted based on results of the evaluation.

In the image forming means constructed by a photosensitive body for producing a latent image based on a result of the scanning means; developing means for developing the latent image to a toner image; transferring means for transferring the toner image onto copy paper; and conveying means for conveying copy paper through the transferring means, it may be preferable to provide a detector provided on a downstream side of the transferring means for detecting the leading edge of copy paper carrying a toner image of the reference original means and the toner image, and memory means for storing a reference timing difference between the leading edge of copy paper and the reference original image; timing difference measuring means for measuring an timing difference between a detection of the leading edge of copy paper and a detection of the reference original image; offset value calculating means for calculating an offset value between the reference timing difference and the measured timing difference; and control means for controlling the conveying means to convey copy paper to the transferring means at such a timing as to correct an offset value calculated by the offset value calculating means.

With this construction, actual transfer timing is calculated by the detection of the leading edge of copy paper and reference original image on the copy paper, and compared with the preset reference timing. The control means automatically corrects or adjusts actual transfer timings to the specified timing.

Further, in an image forming apparatus provided with further paper refeeding means for feeding the copy paper carrying the reference original image to the transferring means again, it may be preferable to provide the detector at an appropriate position on paper refeeding means, and render the control means control the paper refeeding means to refeed the copy paper at such a timing as to correct a calculated offset value. This construction assures refeeding of copy paper at the correct timing.

In an image forming apparatus provided with a photosensitive body for producing a latent image based on a result of the scanning means; and magnification adjusting means for adjusting the magnification of latent image, furthermore, it may be appropriate that the reference original means is constructed by a leading reference marker provided at a forward outside of a leading edge of the original placement portion; and a trailing reference marker provided at a backward outside of a trailing edge of the original placement portion: and the reading means is constructed by a detector for detecting a latent image of the leading reference marker and a latent image of the trailing reference marker: and the image forming apparatus is further provided with memory means for storing a reference timing difference between the leading reference marker image and the trailing reference marker image in the life-size magnification; timing difference measuring means for measuring a timing difference between a detection of the leading reference marker image and a detection of the trailing reference marker image in the life-size magnification; and correction value calculating means for calculating, based on the reference timing difference and the measured timing difference, a correction value for the magnification adjusting means to provide the true life-size magnification.

With this construction, a correction value for the life-size magnification is calculated by measuring a timing difference between a detection of the leading reference marker image and a detection of the trailing reference marker image, and comparing the measured timing difference with the preset reference timing difference. The magnification adjusting means can adjust the magnification in accordance with the calculated correction value, thus enabling the magnification adjustment to be automated.

The magnification adjusting means may include drive means for driving the scanning means to scan at a specified speed. Also, the magnification adjusting means may include drive means for driving the photosensitive body to revolve at a specified speed.

It may be preferable to provide the reference original means with a scan surface flush with an upper surface of the original placement portion. This construction assures higher accuracy in image forming.

It may be preferable to provide the selection means with a plurality of adjusting modes in the scanning of the reference original means, and provide a reference original means constructed by a rotary shaft aligned in a main scanning direction; drive means for rotating the rotary shaft; a block fixedly attached on the rotary shaft and having a plurality of side surfaces arranged in a rotating directions, the plurality of side surfaces being respectively provided with different reference original members corresponding to the plurality of adjusting modes; and control means for controlling the drive means to render the corresponding reference original member of the block face the scanning means in accordance with a selected adjusting mode.

With this construction, the block is provided with a plurality of reference original members respectively corresponding to a plurality of adjusting modes, and is rotated to allow the corresponding reference original member to faces the scanning means in accordance with a selected adjusting mode. Accordingly, this can easily provide a reference original member most suitable to a selected adjusting mode.

It may be preferable to further provide the reference original means with means for setting a sequence of adjusting modes for the control means. This construction enables a plurality of adjustments to be performed in a predetermined sequence, and thus increases the efficiency of image forming condition adjustment.

Further, it may be appropriate that one of the plurality of reference original members is a leading reference marker, and a trailing reference marker is further provided at a backward outside position of the trailing edge of the original placement portion. This construction enables the magnification adjustment to be performed at a high efficient.

These and other objects, features and advantages of the present invention will become more apparent after having read the following detailed description of preferred embodiments, which are illustrated in drawings.

BRIEF DESCRIPTION OF THE DRAWINGS

FIG. 14 is a flowchart showing detailed operations in toner density adjustment step of the flowchart of FIG. 12.

DETAILED DESCRIPTION OF THE PREFERRED EMBODIMENTS OF THE INVENTION

A first embodiment of the invention will be described referring to a copying machine, an example of an image forming apparatus, depicted in FIGS. 1 through 3.

Figure 1:
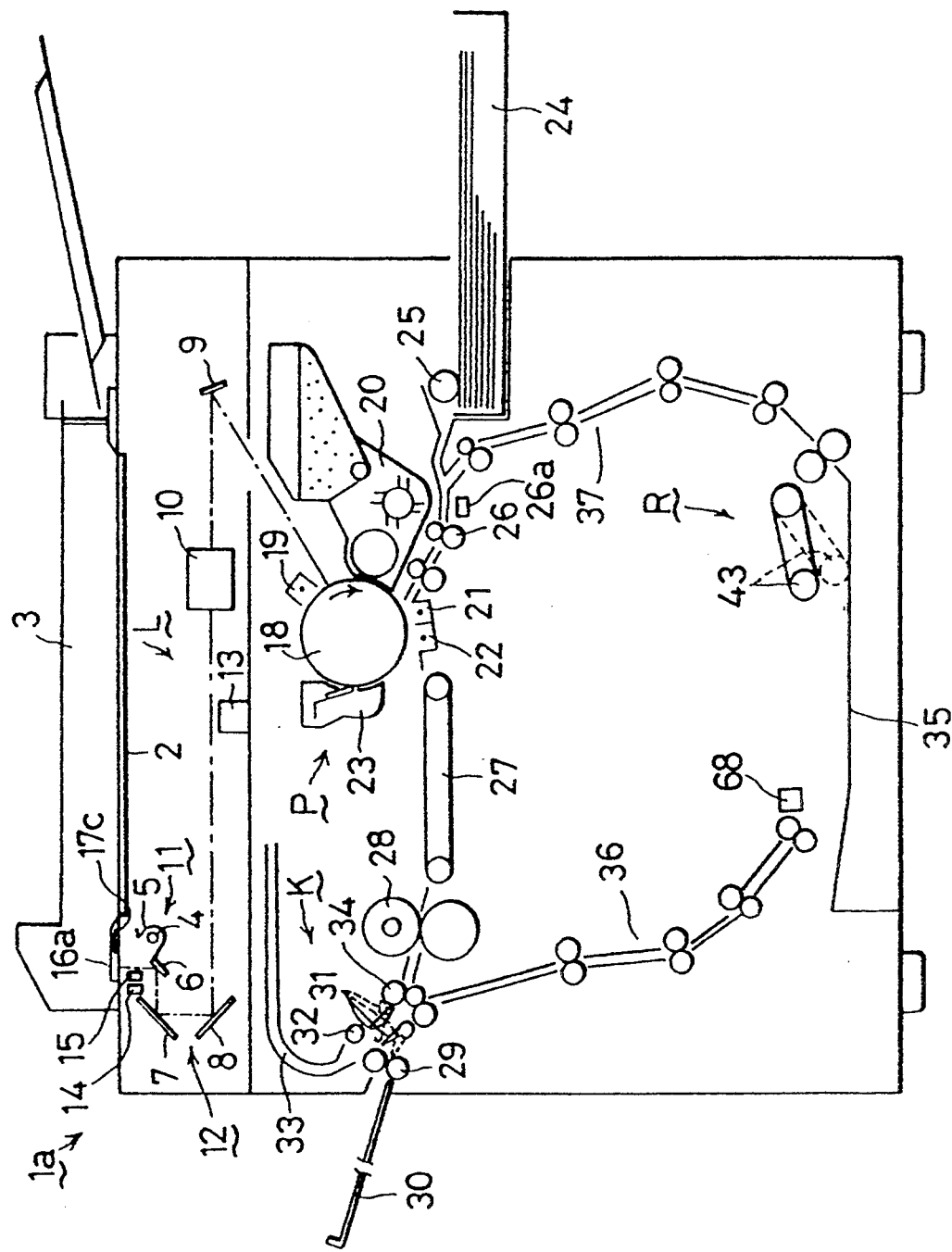
FIG. 1 is a schematic diagram of a copying machine shown as a first embodiment of the present invention.
Figure 2:
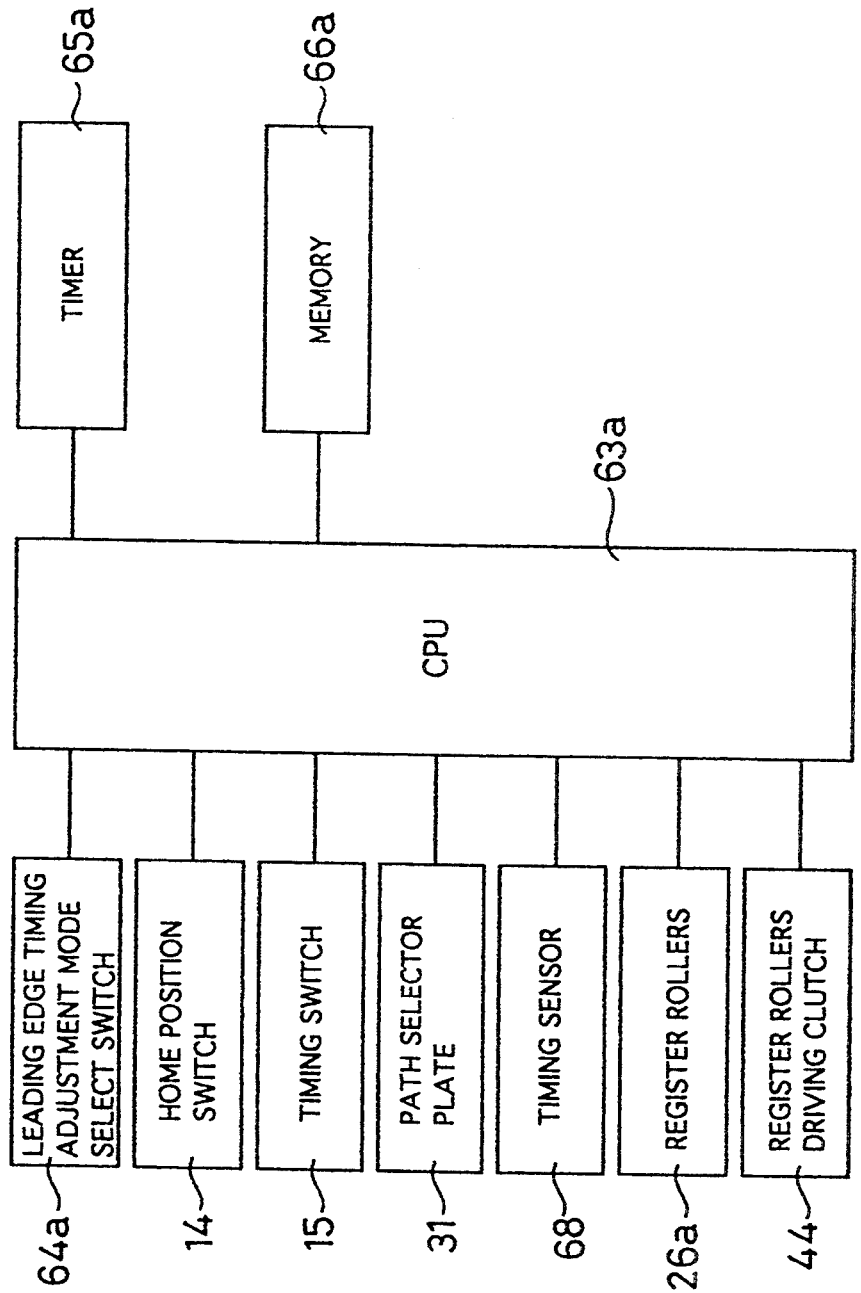
FIG. 2 is a block diagram of a control system for adjusting leading edge timing in the copying machine of the first embodiment.

FIG. 1 is a schematic diagram of the copying machine shown as the first embodiment of the in invention. As shown FIG. 1, the copying machine la comprises in its basic configuration an original glass plate 2 at the top and an automatic document feeder 3 for automatic feed and discharge of original documents on top of the original glass plate 2, as well as an optical portion L, an image forming portion P, a paper inverting mechanism K, a paper refeeding mechanism R, and a paper transport mechanism for feeding and conveying copy paper inside the machine body.

The optical portion L includes a first optical system 11 comprising a tungsten halogen lamp 4 and reflecting mirrors 5 and 6, a second optical system 12 comprising reflecting mirrors 7 and 8, as well as a reflecting mirror 9 and a focusing lens 10. At approximately the middle of the optical portion L, there is provided an optical drive system motor 13. As the optical system drive motor 13 turns at a particular speed according to information (e.g., pulse frequency setting or wattage setting) stored in a memory of a control unit (not illustrated), the first and second optical systems 11-12 move reciprocally at a specified speed projecting an image of each original document onto the image forming portion P. The revolving motion of the optical system drive motor 13 is converted into a linear motion via a wire and pulley assembly (not illustrated) for reciprocally moving the first and second optical systems 11-12. The first and second optical systems 11-12 are made reciprocally movable under the original glass plate 2 beyond the right and left limits of the secondary scanning range up to where a home position switch 14 is located. This "overrun" feature is employed to help stabilize the scanning speeds of the first and second optical systems 11-12 and luminous intensity of the tungsten halogen lamp 4. The home position switch 14 is used to set a home position of the first optical system 11 while a timing switch 15 provides reference timing for each forward-going movement. Upon detecting the first and second optical systems 11-12 set at the home position, the two switches indicate operating timing for individual mechanisms of the copying machine 1a.

There is readily provided a reference line original member 17c for adjusting leading edge timing between the position where the timing switch 15 establishes reference timing for each forward-going movement and the original glass plate 2, just on the underside of a marker plate 16a for indicating a line with which the leading edge of an original should be aligned. The reference line original member 17c has a white surface on which a straight reference line is marked parallel with the main scanning direction of the copy paper. The reference line on the reference line original member 17c is reproduced onto the copy paper while adjusting leading edge timing as will been discussed later. The reference line original member 17c is mounted flush with the upper surface of the original glass plate 2 to ensure optimum detecting accuracy.

The image forming portion P comprises a photosensitive drum 18 for carrying an electrostatic latent image according to a light image projected from the optical portion L, a charging unit 19 for charging the surface of the rotating photosensitive drum 18 to a specified potential, a developing unit 20 for producing a visible toner image from the electrostatic latent image, a transfer unit 21 for transferring the toner image from the photosensitive drum 18 onto a sheet of copy paper, a separator 22 for separating the copy paper from the photosensitive drum 18 after the image transfer process, and a cleaning unit 23 for removing toner particles remaining on the photosensitive drum 18.

The paper transport mechanism comprises, from the upstream side, a paper cassette 24, a paper feed roller 25 and a pair of register rollers 26. Immediately before the pair of register rollers 26, there is provided a register switch 26a. The pair of register rollers 26 are automatically stopped when a preset time period elapses after the copy paper has turned on the register switch 26a. They are started again at appropriate timing (or leading edge timing) synchronized with the forward-going movement of the optical systems for feeding the copy paper to the photosensitive drum 18. On the downstream side of the photosensitive drum 18, the paper transport mechanism comprises a conveying belt 27, a fixing unit 28, a pair of discharger rollers 29 and a copy paper receiving tray 30 for sending and discharging the copy paper after the image transfer process.

The paper inverting mechanism K is located between the fixing unit 28 and the pair of discharger rollers 29. It includes a path selector plate 31, a reversing roller 32 and an inverting path 33. The path selector plate 31 can be set to different positions shown by solid lines and dashed lines in FIG. 1 to switch between alternative paper paths: one for guiding the copy paper straight from a pair of conveying rollers 34 to the pair of discharger rollers 29, and the other for guiding the copy paper after the fixing process into the inverting path 33 and then sending out the inverted copy paper into the paper refeeding mechanism R. When the copy paper is being sent to the paper refeeding mechanism R, the reversing roller 32 is offset and brought into contact with one of the discharger rollers 29.

The paper refeeding mechanism R forms a returning paper path from the paper inverting mechanism K to the paper feeding side. It comprises an intermediate tray 35, an interconnecting path 36 for guiding the copy paper to the intermediate tray 35, and a refeeding path 37 for feeding the copy paper from the intermediate tray 35 back to the image forming portion P. The intermediate tray 35 is a molded resin member having preferably a black surface to minimize reflection of light projected from a light emitting device of a timing sensor 68 to be discussed in the following The timing sensor 68 is provided above the upstream side of the intermediate tray 35 close to the downstream end of the interconnecting path 36. The timing sensor 68 is reflection-type photosensor containing a light emitting device and a light-sensitive device that can discriminate between white and a toner color (e.g. black). Further, there is provided a refeeding roller 43 above the downstream side of the intermediate tray 35 for sending out the copy paper.

In the copying machine 1a described above, light emitted by the tungsten halogen lamp 4 is reflected by an original placed on the original glass plate 2 and the reflected image is directed to the photosensitive drum 18 via the reflecting mirrors 6, 7 and 8, focusing lens 10 and reflecting mirror 9. While the photosensitive drum 18 rotates in the direction of the arrow shown in FIG. 1, the charging unit 19 charges the drum surface to a specified potential. Then, an electrostatic latent image is produced on the photosensitive drum 18 as it is exposed to the light image projected from the optical portion L. After the electrostatic latent image on the surface of the photosensitive drum 18 has been developed by the developing unit 20, the transfer unit 21 transfers the resultant toner image onto a sheet of copy paper fed from the paper cassette 24. Following the image transfer process, the copy paper is separated from the photosensitive drum 18 by the separator 22 and discharged onto the copy paper receiving tray 30 via the conveying belt 27, fixing unit 28 and discharger rollers 29.

On the other hand, when copying on both sides of a sheet of paper, the path selector plate 31 is set as shown by solid lines in FIG. 1 in order that the already fixed copy paper is once led into the inverting path 33. Then, guided through the interconnecting path 36, the copy paper is carried down and placed on the intermediate tray 35 with the already copied side facing upward. Outputted from the intermediate tray 35 at proper timing by means of the refeeding roller 43, the copy paper is sent back to the image forming portion P through the refeeding path 37. Subsequently, the aforementioned processes are repeated to copy an image of another original on the reverse side of the copy paper and discharge it onto the copy paper receiving tray 30.

Referring now to the block diagram of FIG. 2, a control system for adjusting leading edge timing will be described below. Indicated at 63a is a central processing unit (hereinafter referred to as CPU) for controlling overall operation of the copying machine 1a. As an example, the CPU 63a outputs a control signal for switching the copying machine 1a from normal copy mode to leading edge timing adjustment mode upon receiving an operation signal from a leading edge timing adjustment mode select switch 64a on a control panel (not illustrated) which is provided at an appropriate position on the top of the copying machine 1a. Then, as will be discussed later in further detail, the CPU 63a measures the difference in detection timing between the leading edge of the COPY paper and the reference line on a reproduced image of the reference line original member 17c, compares the measured timing difference with its reference value and calculates a count time for a timer by which leading edge timing controlled. Further, the count time data is store in an internal memory of the CPU 63a overwriting the previous data.

Indicated at 66a is a memory for storing a reference value of detection timing difference (or timing difference criterion) between the leading edge of the copy paper and the reference line on a reproduced image of the reference line original member 17c.

Indicated at 65a is a timer for counting a time period stored in the internal memory of the CPU 63a. The home position switch 14 outputs a detection signal to the CPU 63a when the first and second optical systems 11-12 have been set at their home positions. Upon receiving the detection signal from the home position switch 14, the CPU 63a starts to feed the copy paper and, when a specified time period elapses after the register switch 26a has turned on, stops driving the pair of register rollers 26. On the other hand, when a certain time period elapses after receiving an ON signal from the register switch 26a (i.e., when the driving of the pair of register rollers 26 has temporarily been stopped), the CPU 63a outputs a control signal which causes the first and second optical systems 11-12 to start their reciprocal movements and the tungsten halogen lamp 4 to light. When turned on by the first optical system 11 as it is moving, the timing switch 15 outputs a detection signal to the CPU 63a. This signal causes the timer 65a to start counting. When the timer 65a has counted a previously set time period, the CPU 63a outputs a control signal to a register roller driving clutch 44, which conveys a revolving force to the pair of register rollers 26 for sending the copy paper to the image forming portion P. At the same time, when leading edge timing adjustment mode is selected, the CPU 63a sets the path selector plate 31 in such a manner that the copy paper after, the image transfer process is fed into the paper refeeding mechanism R.

When the pair of register rollers 26 are activated, the copy paper is sent to the image forming portion P, where an image of the reference line original member 17c is reproduced on the copy paper and then the copy paper is carried down to the intermediate tray 35.

As mentioned above, the timing sensor 68 is a reflection-type photosensor which detects the copy paper when the light from the light emitting device is reflected by the copy paper and received by the light-sensitive device. It also detects the reference line reproduced on the copy paper from the reference line original member 17c as the light from the light emitting device is interrupted by that reference line. Further, the timing sensor 68 detects the leading edge of the copy paper when the light from the light emitting device is interrupted (or the reflection is lost) as the copy paper completely passes the timing sensor 68. In short, the timing sensor 68 detects the reproduced reference line and the leading edge of the copy paper when it is brought to the intermediate tray 35, and outputs a resultant signal to the CPU 63a. It is to be noted that since the feed direction of the copy paper is reversed in the paper refeeding mechanism R, the "leading edge" mentioned above is actually a trailing edge there. As a convention in the following discussion, it will be called the "leading edge" referring to the feed direction in the image transfer process rather than that in the paper refeeding mechanism R.

Based on the signal fed from the timing sensor 68, the CPU 63a calculates the time interval from detection of the reproduced image of the reference line to detect ion of the leading edge of the copy paper, or the distance between them by applying the paper feeding speed. The calculated value, or the detection timing difference, is compared with a preset reference value, or the timing difference criterion. If the comparison reveals disagreement between the two values, it is judged that the leading edge timing is not properly set. In this case, the CPU 63a calculates an offset value, adds it to the previously stored leading edge timing data and updates the leading edge timing data in the internal memory. The count time of the timer 65a is thus decreased or increased for advancing or delaying the start timing of the pair of register rollers 26. Accordingly, the arrangement described above makes it possible to adjust the difference in detection timing between the leading edge of the copy paper and the reproduced image of the reference line, or in short, the leading edge timing.

If the timing sensor 68 always transmits a signal indicating existence or non-existence of an original and a reproduced image of the reference line, the CPU 63a may detect the image of the reference line and the leading edge of the copy paper based on such a signal. In this case, the CPU 63a can conveniently detect the image of the reference line and the leading edge of the copy paper from signal level variations that would occur when the detecting point shifts from the original surface of the copy paper to the reproduced reference line and when the leading edge of the copy paper passes the timing sensor 68.

Referring now to the flowchart of FIG. 3, operation of the copying machine 1a of the first embodiment will be described below. When the leading edge timing adjustment mode select switch 64a is operated in Step S1, the first and second optical systems 11–12 are reset to their home positions and a sheet of copy paper is fed from the paper cassette 24 to the pair of register rollers 26 (Step S2). Then, the first and second optical systems 11–12 begin their reciprocal movements (Step S3).

When the first optical system 11 is detected by the timing switch 15 (YES in Step S4), the timer 65a starts to count time (Step S5). When a preset time (leading edge timing) has passed (YES in Step S6), the pair of register rollers 26 are activated (Step S7). As a result, the copy paper is sent to the photosensitive drum 18 and an image of the reference line original member 17c is reproduced on the copy paper (Step S8).

Subsequently, the copy paper carrying an image of the reference line original member 17c is guided into the paper inverting mechanism K and brought down onto the intermediate tray 35, where timing sensor 68 detects the image of the reference line reproduced from the reference line original member 17c and the leading edge of the copy paper (Step S9) and a resultant detection signal is delivered to the CPU 63a.

The CPU 63a calculates the detection timing difference based on the detection signal and judges whether the detection timing difference coincides with the timing difference criterion (Step S10). If the calculated detection timing difference coincides with the timing difference criterion (YES in Step S10), the copy paper on the intermediate tray 35 is discharged (Step S21) and the operation flow completes.

On the contrary, if the calculated detection timing difference differs from the timing difference criterion (NO in Step S10) the operation flow proceeds to Step S11. In Step S11, the CPU 63a calculates an offset value for matching the detection timing difference with the with the timing difference criterion. The leading edge timing data is corrected by adding the offset value and stored in the internal memory of the CPU 63a.

Next, the copy paper on the intermediate tray 35 is fed back to the image forming portion P and the pair of register rollers 26 are started based on a corrected count time of the timer 65a, or at corrected leading edge timing. An image of the reference line original member 17c is now reproduced on the reverse side of the copy paper (Steps S12–S17) and then the copy paper is brought again onto the intermediate tray 35. At this point, the detection timing difference is measured again (Step S18) to reevaluate the corrected leading edge timing (Step S19). If the corrected detection timing difference coincides with the timing difference criterion (YES in Step S19), the operation flow proceeds to Step S21 and the operation flow completes. If, however, they do not coincide (NO in Step S19), the operation flow proceeds to Step S20, where the count time of the timer 65a is corrected in a similar manner to Step S11 and the corrected count time, or the leading edge timing data, is stored in the internal memory of the CPU 63a overwriting the previous data.

The operation flow now returns to Step S2, and after the copy paper remaining on the intermediate tray 35 has been discharged, a new sheet of copy paper is supplied from the paper cassette 24.

When the detection timing difference finally coincides with the timing difference criterion (YES in Step S10 or S19), the copy paper remaining on the intermediate tray 35 is discharged onto the copy paper receiving tray 30 (Step S21) and the operation flow completes.

In the copying machine 1a of the first embodiment described above, the leading edge timing of the copy paper can be adjusted automatically by simply selecting leading edge timing adjustment mode. Since the copying machine 1a is provided with the built-in reference line original member 17c, it will no longer be necessary for service personnel to carry dedicated reference original sheets or place them on the original glass plate 2 for conducting leading edge timing adjustment. Furthermore, since the above copying machine 1a has the double-sided copying function, adjustment of leading edge timing and confirmation of adjustment results can be made using a single sheet of copy paper. It is therefore another advantage of the first embodiment that consumption of copy paper in leading edge timing adjustment is substantially reduced.

Figure 4:
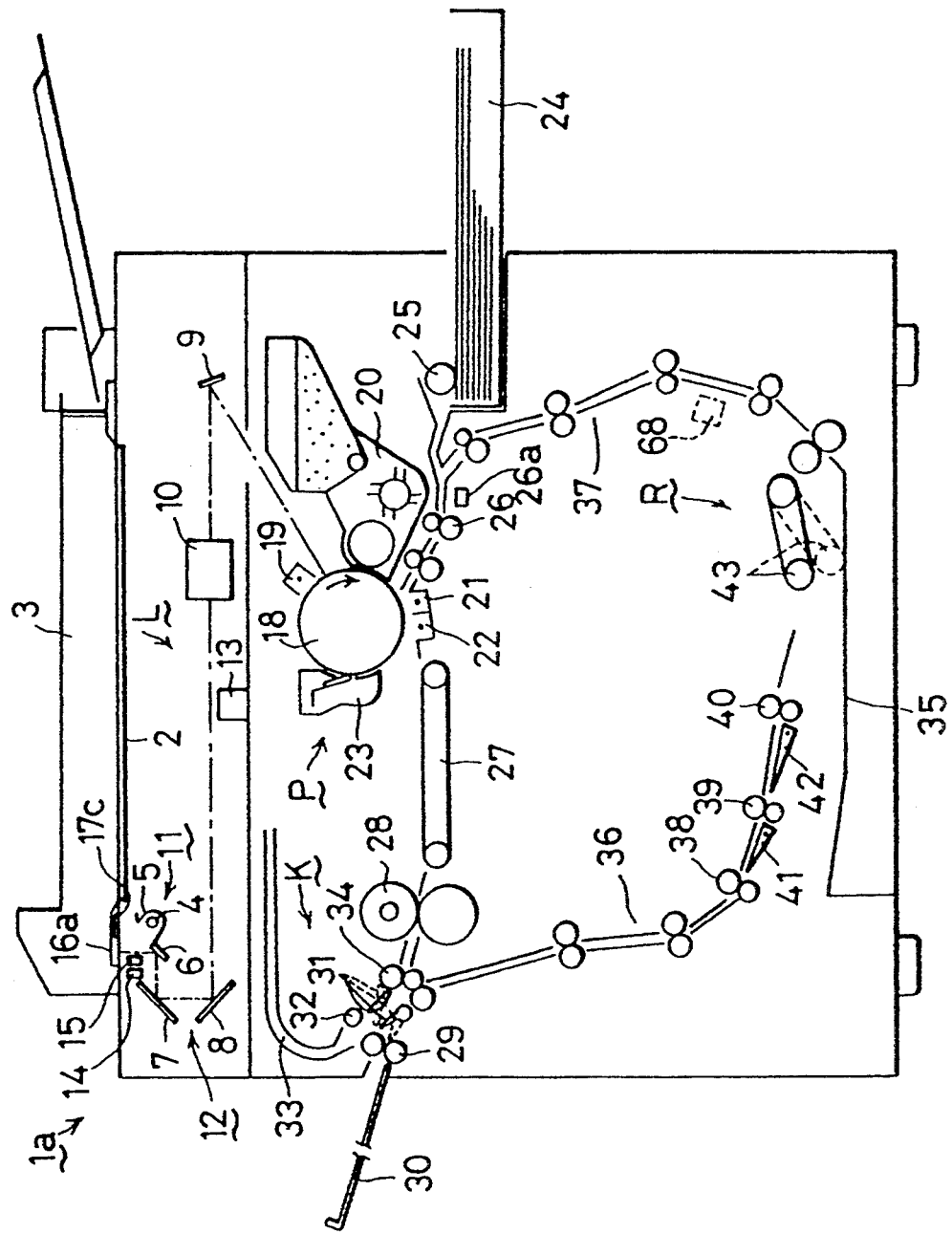
FIG. 4 is a schematic diagram of a copying machine shown as a variation of the first embodiment of the invention.

In the first embodiment described above, the timing sensor 68 is provided above the intermediate tray 35 close to the downstream end of the interconnecting path 36. If, however, the interconnecting path 36 comprises at its downstream end pairs of conveying rollers 38, 39 and 40 and shortcut path selectors 41 and 42 between them for adjusting the length of the paper path up to the intermediate tray 35 depending on the paper size as shown in FIG. 4, the timing sensor 68 may be located differently. As an example, it may be provided immediately on the upstream side of the conveying rollers 38 beside the interconnecting path 36 as shown in FIG. 4 or at some point near the refeeding path 37 as shown by dashed lines for detecting the copy paper being fed.

In one variation, the timing sensor 68 may be buried in the intermediate tray 35. In another variation, the timing sensor 68 may be provided above the intermediate tray 35 immediately on the upstream side of the refeeding roller 43 so that it can detect leading edge timing when the copy paper is fed from the intermediate tray 35 back to the pair of register rollers 26. In still another variation, the timing sensor 68 may be provided at a point between the transfer unit 21 and path selector plate 31.

As seen above, the first embodiment allows leading edge timing adjustment to be performed by operating the leading edge timing adjustment mode select switch 64a whenever the need arises, e.g., when the quality or thickness of copy paper has been changed or any member that can affect the leading edge timing has been changed, or after servicing or inspection of the copying machine 1a. In a varied form of embodiment, leading edge timing adjustment may automatically be performed each time the power is turned on or a specified number of copies have been produced or at regular intervals of elapsed time. Although the first embodiment utilizes a straight reference line as a reference marker for leading edge timing, it may be a short line segment or a dot provided that the timing sensor 68 is so arranged that such a line segment or dot can be successfully detected.

Next, a second embodiment of the invention will be described referring to a copying machine depicted in FIGS. 5 through 7.

Figure 5:
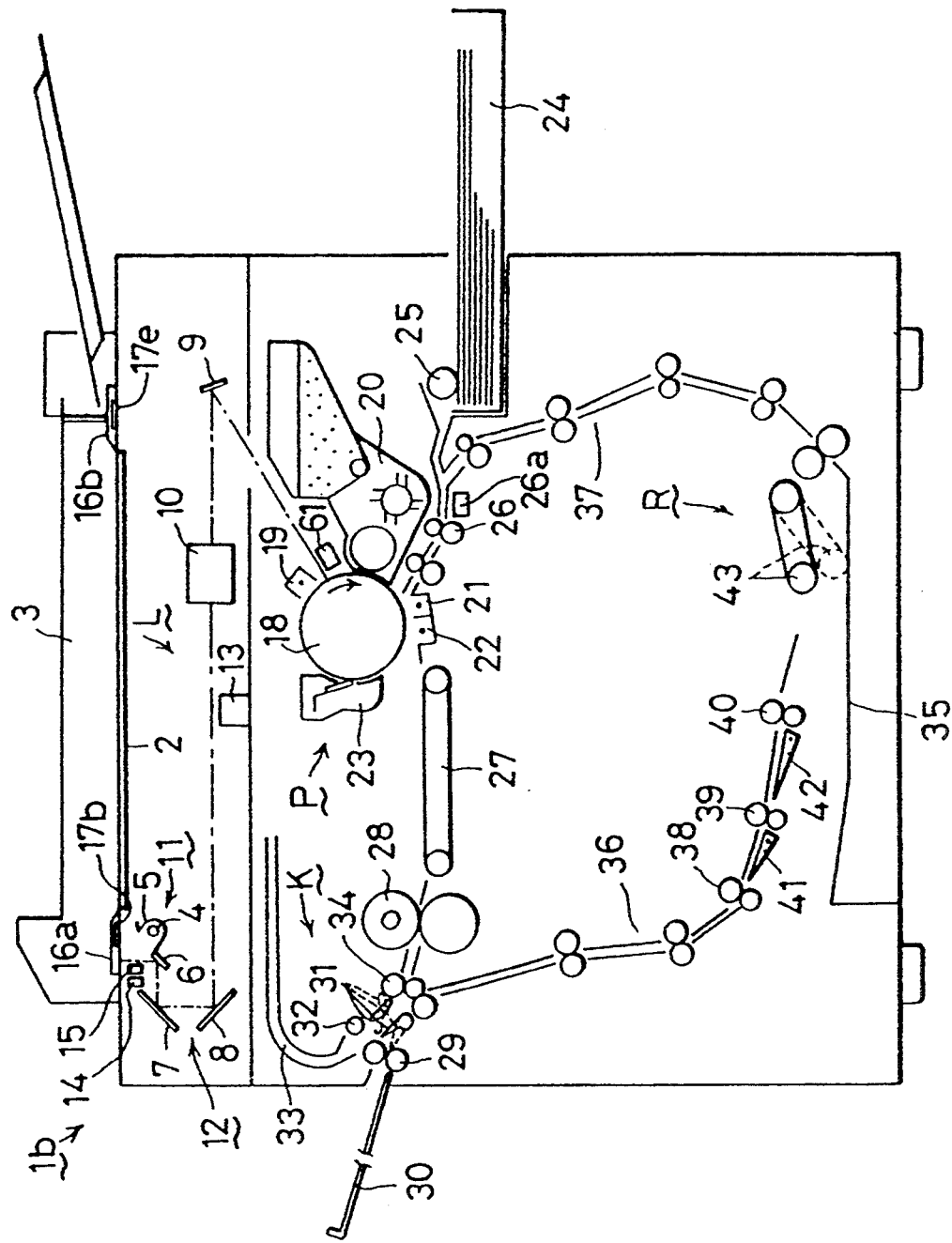
FIG. 5 is a schematic diagram of a copying machine shown as a second embodiment of the present invention.
Figure 6:
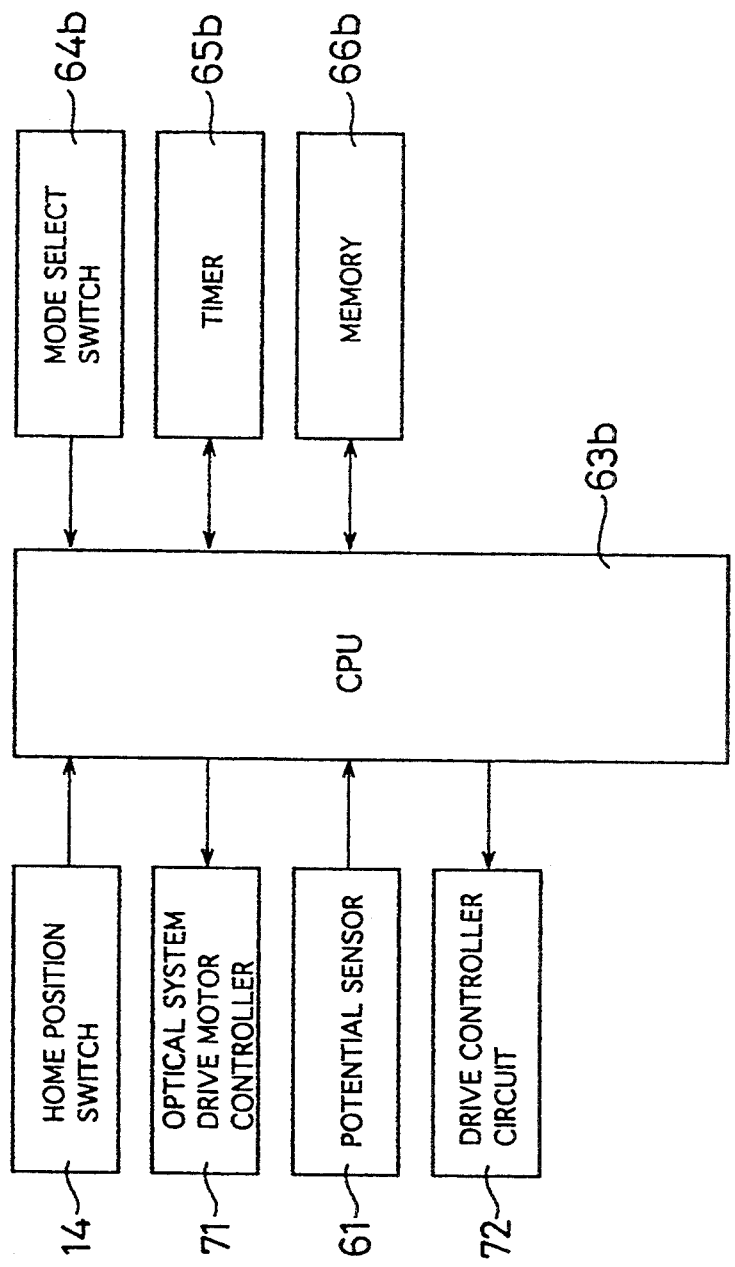
FIG. 6 is a block diagram of a control system for adjusting life-size magnification in the copying machine of the second embodiment.

FIG. 5 is a schematic diagram of the copying machine shown as the second embodiment of the invention. Since the copying machine 1b of the second embodiment has basically the same construction as the copying machine 1a of the first embodiment, internal units and components that perform the same functions will be identified by using the same reference numbers. The copying machine 1b of the second embodiment will be described in the following focusing on its differences from the first embodiment.

As shown in FIG. 5, the copying machine 1b is provided with a leading edge reference line original member 17b on the underside of the marker plate 16a of the optical portion L instead of the reference line original member 17c of the first embodiment. On the other side of the original glass plate 2, there is provided a trailing edge reference line original member 17e on the underside of a marker plate 16b located at an appropriate position for indicating a trailing edge limit line for an original document. The leading edge reference line original member 17b and trailing edge reference line original member 17e each have a white surface on which a straight reference line is marked parallel with the main scanning direction. When adjusting life-size magnification, the 17b and trailing edge reference line original member 17e are scanned and reproduced on a sheet of copy paper as will be discussed later. The leading edge reference line original member 17b and trailing edge reference line original member 17e are mounted flush with the upper surface of the original glass plate 2 to ensure optimum detecting accuracy.

The image forming portion P comprises a potential sensor 61 for detecting electrostatic latent images formed on the surface of the photosensitive drum 18. The potential sensor 61 is mounted close to the drum surface between the charging unit 19 and developing unit 20, immediately on the downstream side of the exposure point of the photosensitive drum 18.

Unlike the copying machine 1a of the first embodiment, the copying machine 1b of the second embodiment is not provided with the timing sensor 68.

Referring now to the block diagram of FIG. 6, a control system for adjusting life-size magnification will be described below. Indicated at 63b is a CPU for controlling overall operation of the copying machine 1b of the second embodiment. The CPU 63b outputs a control signal to a drive controller circuit 72 for switching the copying machine 1b from normal copy mode to magnification adjusting mode upon receiving an operation signal from a mode select switch 64b provided on a control panel (not illustrated). As will be discussed later in further detail, the scanning range of the first and second optical systems 11–12 is extended in magnification adjusting mode to include the leading edge reference line original member 17b and trailing edge reference line original member 17e.

When magnification adjusting mode has been selected, the drive controller circuit 72 controls individual driving means to cause the first and second optical systems 11–12 to pick up images of the leading edge reference line original member 17b and trailing edge reference line original member 17e and form corresponding electrostatic latent images on the photosensitive drum 18.

Indicated at 66b is a memory for storing a reference value of the time period required for the first and second optical systems 11–12 to scan from the reference line on the leading edge reference line original member 17b to that on the trailing edge reference line original member 17e at a certain magnification (e.g., magnification 100%), the time period corresponding to the detecting time interval between latent images of the leading edge and trailing edge reference lines formed on the photosensitive drum 18. In case the memory 66b stores a reference value of the detecting time interval for a magnification of 100%, the drive controller circuit 72 sets the magnification to 100% when magnification adjusting mode is selected.

The CPU 63b measures the time required for the first and second optical systems 11–12 to scan from the reference line on the leading edge reference line original member 17b to that on the trailing edge reference line original member 17e, compares the measured time interval with its reference value (or time interval criterion), calculates a correction value for the magnification and stores it in an internal memory.

When the first and second optical systems 11–12 start their reciprocal movements, an electrostatic latent image of the reference line on the leading edge reference line original member 17b is first formed on the photosensitive drum 18. The potential sensor 61 detects the electrostatic latent image and outputs a resultant detection signal to the CPU 63b. Upon receiving the detection signal from the potential sensor 61, the CPU 63b transmits a control signal which causes a timer 65b to a start counting. As the first and second optical systems 11–12 travel farther, an electrostatic latent image of the reference line on the trailing edge reference line original member 17e is formed on the photosensitive drum 18. The potential sensor 61 detects this electrostatic latent image and outputs a resultant detection signal to the CPU 63b, causing the timer 65b to stop counting. At this point, the timer 65b outputs data on the measured time interval to the CPU 63b.

The CPU 63b compares the measured time interval data fed from the timer 65b with the time interval criterion and calculates the difference between them. Based on this difference, the CPU 63b calculates a correction value for the scanning speed and outputs it to an optical system drive motor controller 71 to adjust the revolving speed of the optical system drive motor 13. Alternatively, given the time interval criterion as a known value, it would be possible to provide a memory for storing settings after adjustment in the form of a reference table so that a desired setting can directly be obtained from the reference table.

Referring now to the flowchart of FIG. 7, life-size magnification adjusting of the copying machine 1b of the second embodiment will be described below.

When magnification adjusting mode is selected by operating the mode select switch 64b (Step S30), the first and second optical systems 11–12 start their reciprocal movements while the tungsten halogen lamp 4 of the first optical system 11 is lit and electrostatic latent images of the reference lines on the leading edge reference line original member 17b and trailing edge reference line original member 17e are formed on the surface of the photosensitive drum 18 (Step S31). The potential sensor 61 detects the latent images of the reference lines on the leading edge reference line original member 17b and trailing edge reference line original member 17e in sequence. At the same time, the timer 65b counts the time interval between the moments when the latent images of the two reference lines are detected (Steps S32–S35). When both the leading edge reference line original member 17b and trailing edge reference line original member 17e have been scanned, the first and second optical systems 11–12 are reset to their home positions.

Next, the CPU 63b judges whether the measured time interval data received from the timer 65b coincides with the time interval criterion (Step S36). If the measured time interval coincides with time interval criterion (YES in Step S36), the operation flow proceeds to Step S37, where the copying machine 1b is returned to normal copy mode and the sequence is completed.

On the contrary, if the measured time interval differs from the time interval criterion (NO in Step S36), that is, there is a magnification error in the reproduced image, the CPU 63b calculates the difference between them (Step S38). Based on this difference, the CPU 63b further calculates a correction value (Step S39), and increases or decreases the revolving speed of the optical system drive motor 13, for example, by an amount corresponding to the correct ion value to achieve life-size magnification. At the same time, the correction value or the amount to be added to the revolving speed of the optical system drive motor 13, or any other setting corresponding to the corrected revolving speed is stored in the internal memory (Step S40). The parameter to be adjusted would be pulse frequency in case the optical system drive motor 13 is a pulse motor; wattage in case the optical system drive motor 13 is a DC motor.

When life-size magnification has been adjusted as described above, the operation flow returns to Step S31, from where the optical portion L and image forming portion P are restarted at a corrected speed of the optical system drive motor 13 to verify the result of adjustment. The above sequence is repeated until successful life-size magnification is obtained (YES in Step S36) and the copying machine 1b is finally returned to normal copy mode.

As seen above, it is possible to adjust the moving speed of the first and second optical systems 11–12 to achieve successful life-size magnification by altering the revolving speed of the optical system drive motor 13.

In the copying machine 1b of the second embodiment described above, life-size magnification can be adjusted automatically by simply selecting magnification adjusting mode. Since the copying machine 1b is provided with the built-in leading edge reference line original member 17b and trailing edge reference line original member 17e, it will no longer be necessary for service personnel to carry dedicated reference original sheets or place them on the original glass plate 2 for conducting life-size magnification adjusting. Furthermore, the above copying machine 1b is constructed to perform life-size magnification adjusting by detecting the electrostatic latent images on the photosensitive drum 18 with the potential sensor 61. It is therefore another advantage of the second embodiment that consumption of copy paper in life-size magnification adjusting is substantially reduced.

According to the second embodiment described above, the potential sensor 61 is mounted close to the photosensitive drum 18 with its sensitive side facing the drum surface immediately on the downstream side of the exposure point of the photosensitive drum 18 for detecting the electrostatic latent images of the leading edge reference line original member 17b and trailing edge reference line original member 17e formed on the photosensitive drum 18. In a varied form of the embodiment, a density sensor may be provided on the downstream side of the developing unit 20 to detect a toner image formed on the surface of the photosensitive drum 18, for example.

In the copying machine 1b described above, when life-size magnification has been adjusted (Step S40), the operation flow returns to Step S31 to restart the optical portion L and image forming portion P at a corrected speed of the optical system drive motor 13 to verify the result of adjustment. It is however possible to modify the routine in such a manner that the adjustment of life-size magnification is finished With only one adjustment cycle, in which case the operation flow proceeds from Step S40 to Step S37 directly.

Also in the second embodiment described above, the magnification error is corrected by altering the revolving speed of the optical system drive motor 13, which is one of the parameters usable for magnification adjusting. Alternatively, the revolving speed of the photosensitive drum 18 may be altered by adjusting the speed of a main motor (not illustrated) or other driving means of the photosensitive drum 18.

Although the copying machine 1b of the second embodiment is provided with the double-sided copying function, it would be understood that the invention is applicable to a copying machine having only the single-sided copying function. Furthermore, although adjustment of life-size magnification is initiated by operating the mode select switch 64b in the embodiments so far described, it may automatically be performed each time the power is turned on or a specified number of copies have been produced or at regular intervals of elapsed time.

Next, a third embodiment of the invention will be described referring to a copying machine depicted in FIGS. 8 through 14.

Figure 8:
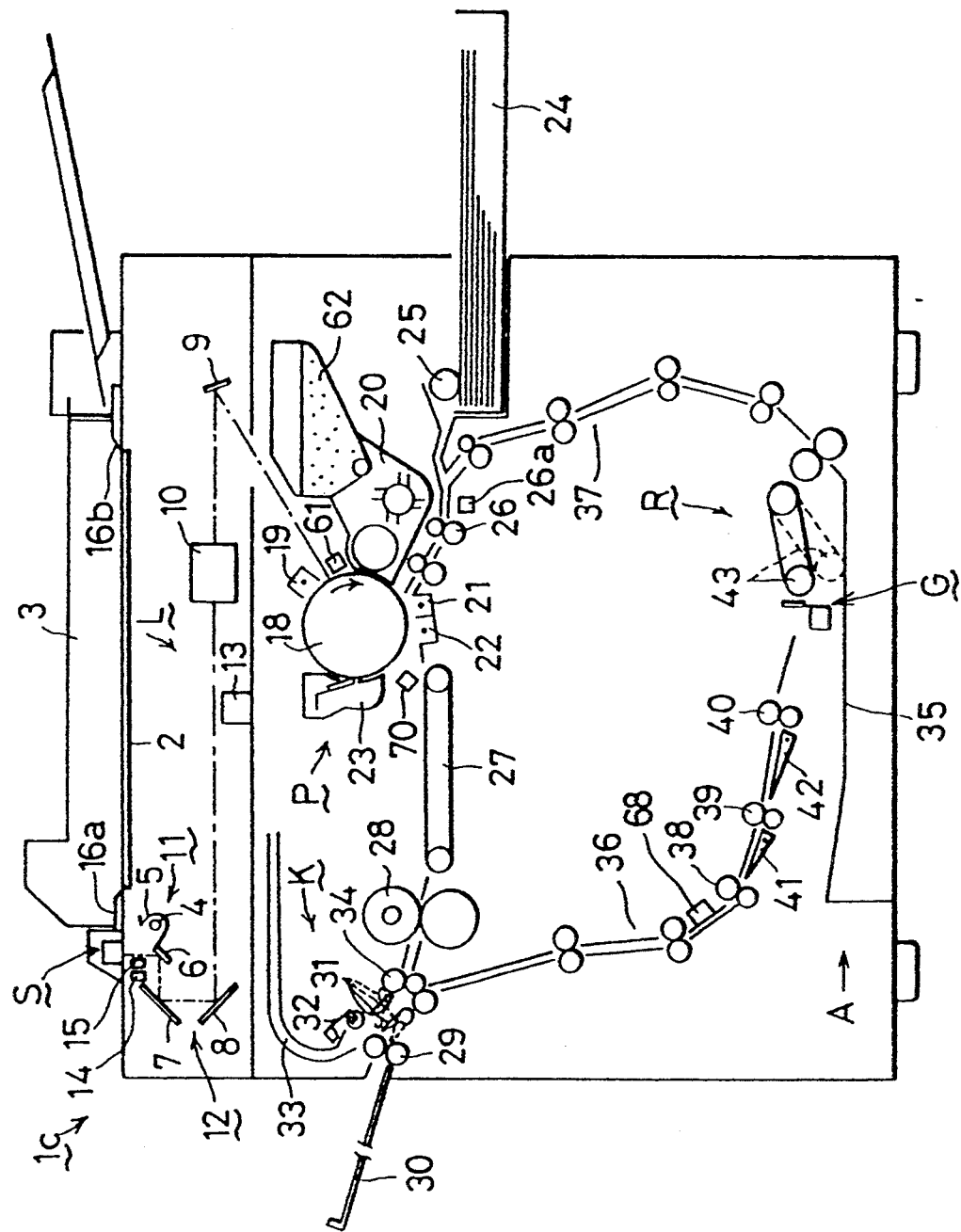
FIG. 8 is a schematic diagram of a copying machine shown as a third embodiment of the present invention.

FIG. 8 is a schematic diagram of the copying machine shown as the third embodiment of the invention. Since the copying machine 1c of the third embodiment has basically the same construction as the copying machine 1a of the first embodiment, internal units and components that perform the same functions will be identified by using the same reference numbers. The copying machine 1b of the second embodiment will be described in the following focusing on its differences from the first embodiment.

As shown in FIG. 8, the copying machine 1c comprises a reference original unit containing a plurality of reference original members to the left of the marker plate 16a between the position where the timing switch 15 establishes reference timing for each forward-going movement and the original glass plate 2. Unlike the copying machine 1a of the first embodiment, the copying machine 1c is not provided with any reference original member on the bottom of the marker plate 16a.

Figure 9:
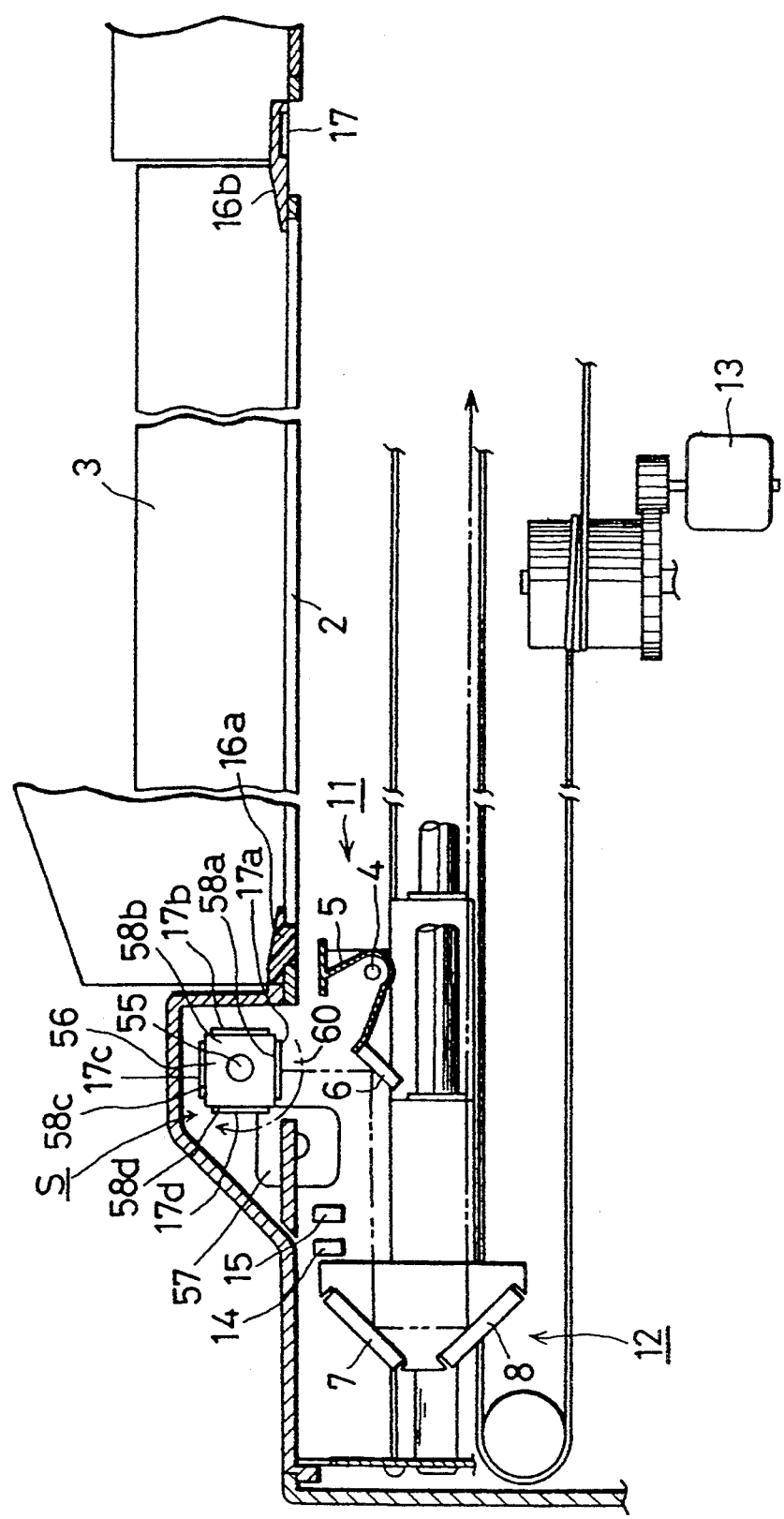
FIG. 9 is an enlarged cross-sectional view of a reference original unit.

As shown in FIG. 9, the reference original unit S comprises a rotary shaft 55 aligned in the main scanning direction to the left of the marker plate 16a, a reference original carrier 56 which is mounted on the rotary shaft 55 to rotate conjointly, a reference original turning motor 57 for turning the reference original carrier 56, and the reference original members attached on a plurality of side surfaces 58a–58d of the reference original carrier 56. Having a shape of a rectangular parallelepiped, for example, the reference original carrier 56 rotates in the direction of the arrow shown by a dot-and-dash line in FIG. 9 as the reference original turning motor 57 is turned by a motor driver (not illustrated). With this arrangement, the side surfaces 58a–58d of the reference original carrier 56 are sequentially faced down toward the optical portion L through a reference original scanning window 60.

The reference original carrier 56 carries, for example, a reference white original member 17a to be used for adjusting luminous intensity of the tungsten halogen lamp 4, the leading edge reference line original member 17b to be used for adjusting life-size magnification in the copying machine 1b of the second embodiment, the reference line original member 17c to be used for adjusting leading edge timing in the copying machine 1a of the first embodiment, and a reference gray original member 17d to be used for adjusting toner density on the respective side surfaces 58a–58d of the reference original carrier 56. As the reference original members 17a–17d are sequentially brought to the reference original scanning window 60, the optical portion L projects their light images to the image forming portion P to form corresponding latent images on the photosensitive drum 18. The individual reference original members 17a–17d are arranged in such a manner that each of them becomes flush with the upper surface of the original glass plate 2 when directed to the reference original scanning window 60 in order to ensure optimum detecting accuracy. Although the reference original carrier 56 has been described as being shaved into a rectangular parallelepiped, it is not limited to that structure but may take a shape of a cylinder, for example, It is however desirable that the reference white original member 17a and reference gray original member 17d each have a flat surface by their very nature.

On the bottom of the marker plate 16b indicating the trailing edge limit line for an original document, there is provided a trailing edge reference line original member 17e, a counterpart of the leading edge reference line original member 17b mounted on the reference original unit S, as seen in the copying machine 1b of the second embodiment. The first and second optical systems 11–12 sequentially project light images of the leading edge reference line original member 17b and trailing edge reference line original member 17e onto the photosensitive drum 18 when adjusting life-size magnification. The trailing edge reference line original member 17e is also arranged flush with the upper surface of the original glass plate 2 like the reference original members 17a–17e to ensure optimum detecting accuracy.

As seen in the copying machine 1b of the second embodiment, the image forming portion P comprises a potential sensor 61 close to the drum surface between the charging unit 19 and developing unit 20, immediately on the downstream side of the exposure point of the photosensitive drum 18. There is also provided a toner density sensor 70 between the separator 22 and cleaning unit 23 for detecting the density of a toner image formed on the photosensitive drum 18.

On the other hand, the paper refeeding mechanism R comprises a density detecting unit G mounted above the intermediate tray 35 immediately on the upstream side of the refeeding roller 43.

Figure 10:
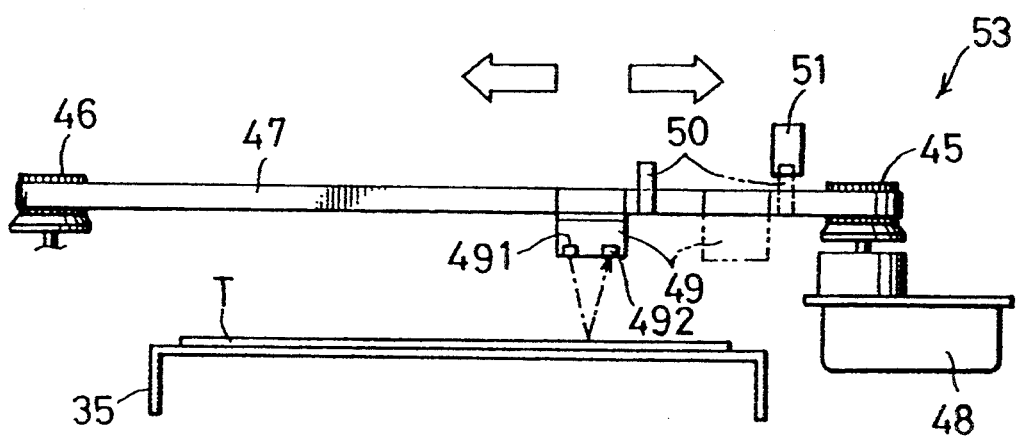
FIG. 10 is a view taken in the direction of arrow A of FIG. 8 showing a density detecting unit.

As shown in FIG. 10, the density detecting unit G comprises an image density sensor 49 for detecting the density of an image on a sheet of copy paper T stored on the intermediate tray 35 and a drive assembly 53 for moving the image density sensor 49 in the main scanning direction (or the direction of arrows in FIG. 10) of the copy paper T.

The drive assembly 53 comprises a front pulley 45, a rear pulley 46, an endless timing belt 47 mounted between the front and rear pulleys 45–46, and a sensor driving motor 48 (e.g., a stepping motor) for turning the front pulley 45. Since the sensor driving motor 48 can be driven in either the normal or reverse direction, the timing belt 47 can rotate in either direction. Attached to an appropriate position of the timing belt 47, the image density sensor 49 moves in the back-and-forth direction according to normal or reverse rotation of the timing belt 47. The image density sensor 49 is, for example, a reflection-type photosensor including a light emitting device 49a and a light-sensitive device 49b. In order to detect the density of a reproduced image on the copy paper T that is stored on the intermediate tray 35, the image density sensor 49 is mounted with its light emitting device 49a and light-sensitive device 49b facing down. Further, a positioning tab 50 is attached to the timing belt 47 while a home position sensor 51 is provided close to the front pulley 45. This arrangement establishes a home position of the image density sensor 49.

In the density detecting unit G described above, the timing belt 47 is turned by the front pulley 45 as the sensor driving motor 48 is driven by a control unit (not illustrated). As a result, the image density sensor 49 moves forward while detecting image density in the main scanning direction of the copy paper T placed on the intermediate tray 35. After detecting image density, the image density sensor 49 is returned to its home position.

In the copying machine 1c of the third embodiment, the density detecting unit G comprises at the downstream end of the interconnecting path 36 pairs of conveying rollers 38, 39 and 40 and shortcut path selectors 41 and 42 between them for adjusting the length of the paper path up to the intermediate tray 35 depending on the paper size. Therefore, the timing sensor 68 is provided immediately on the upstream side of the pair of conveying rollers 38 beside the interconnecting path 36.

Figure 11:
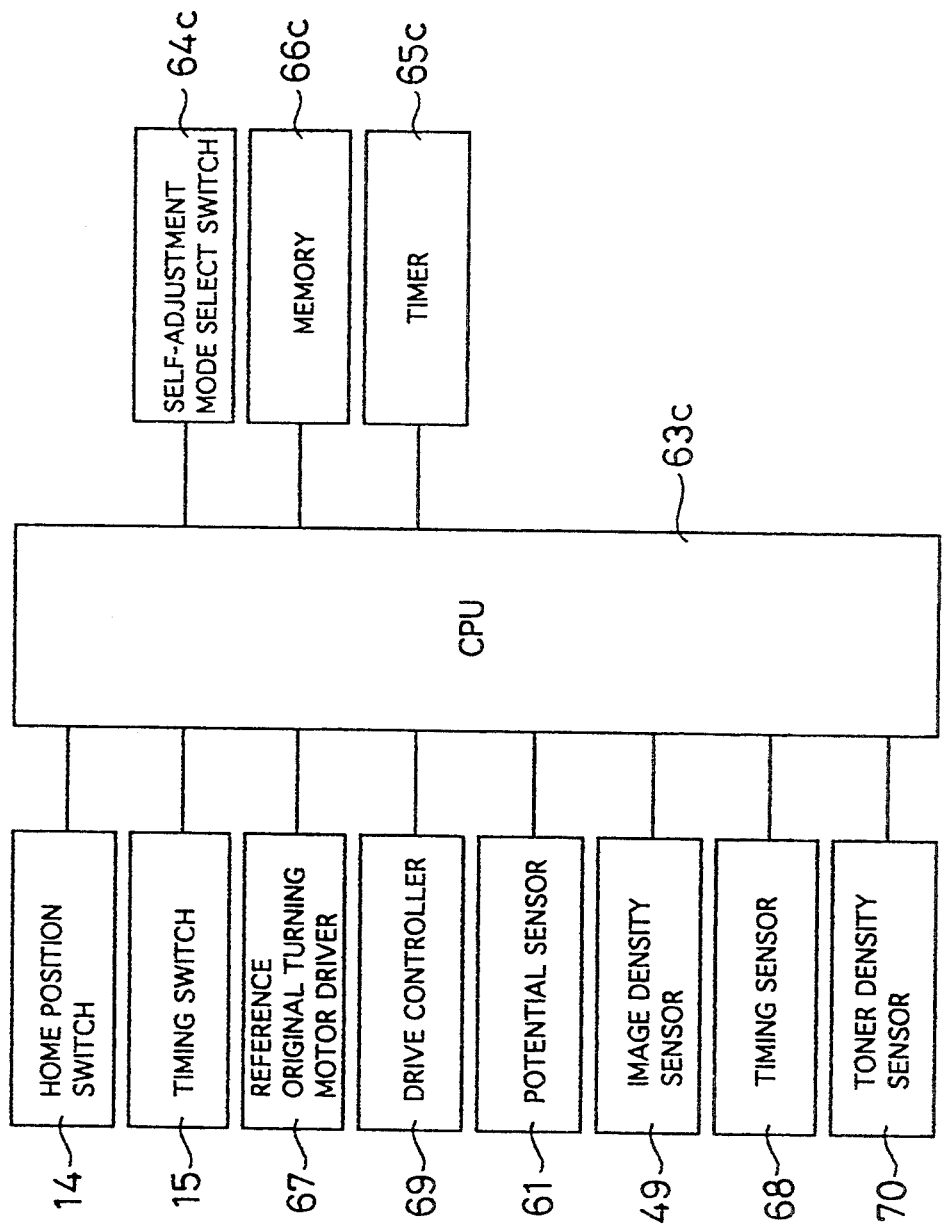
FIG. 11 is a block diagram of a control system for conducting self-adjustment of the third embodiment.

Referring now to the block diagram of FIG. 11, a control system for conducting self-adjustment of the copying machine 1c of tile third embodiment will be described below. Indicated at 63c is a CPU for controlling overall operation of the copying machine 1c. The CPU 63c switches the copying machine 1c from normal copy mode to self-adjustment mode upon receiving an operation signal from a mode select switch 64c provided on a control panel (not illustrated). When the mode select switch 64c is operated, the CPU 63c transmits a control signal to a drive controller 69 for sequentially adjusting luminous intensity of the tungsten halogen lamp 4, life-size magnification, leading edge timing and toner density, and another control signal to a reference original turning motor driver 67 for turning the reference original carrier 56 to sequentially direct the relevant reference original members 17a–17d to the reference original scanning window 60. If it is required to pick up images of not only the reference original members 17a–17d but also the trailing edge reference line original member 17e, the CPU 63c controls the first and second optical systems 11–12 to cover an appropriate scanning range.

The CPU 63c performs the following comparison, judgment and calculation of correction values based on information picked up by the image density sensor 49, potential sensor 61, timing sensor 68 and toner density sensor 70:

(1) Compares measured density data of the reference white original member 17a with optimum density data and calculates a correction value for exposure by the tungsten halogen lamp 4 in luminous intensity adjustment of the tungsten halogen lamp 4.

(2) Compares the time period required for scanning from the leading edge reference line original member 17b to trailing edge reference line original member 17e, or the detecting time interval between reproduced images of the leading edge reference line original member 17b and trailing edge reference line original member 17e, with a preset time interval criterion and calculates a correction value for the revolving speed of the optical system drive motor 13, for example, in life-size magnification adjusting.

(3) Calculates the distance between the leading edge of copy paper and a reproduced image of the reference line original member 17c based on their detection timing difference, compares the calculated value with its reference value and calculates a correction value for the count time of a timer 65c in order to adjust start timing of the pair of register rollers 26 in leading edge timing adjustment.

(4) Compares measured density data of the reference gray original member 17d with optimum density data and judges the need for replenishing the developing unit 20 with toner in Loner density adjustment.

The correction values obtained in the above operations (1)-(4) are registered in an internal memory of the CPU 63c.

The home position switch 14 indicates home positions of the first and second optical systems 11-12 by outputting a detection signal to the CPU 63c when they have been set to their home positions. On the other hand, the timing switch 15 is turned on by the first optical system 11 as it is moving. The resultant ON signal is delivered to the CPU 63c to provide a reference timing for each drive mechanism.

The potential sensor 61 detects electrostatic latent images formed on the surface of the photosensitive drum 18 in life-size magnification adjusting as seen in the copying machine 1b of the second embodiment. More specifically, it detects electrostatic latent images of the reference lines on the leading edge reference line original member 17b and trailing edge reference line original member 17e and outputs a resultant signal to the CPU 63c.

The image density sensor 49 is used for luminous intensity adjustment of the tungsten halogen lamp 4. When adjusting luminous intensity of the tungsten halogen lamp 4. the image density sensor 49 is reciprocally moved in the main scanning direction to read density of an image of the reference white original member 17a reproduced on the copy paper that is stored on the intermediate tray 35. The image density sensor 49 then outputs density data detected across the copy paper to the CPU 63c.

The timing sensor 68 is used for leading edge timing adjustment as in the copying machine 1a of the first embodiment. It reads image density of the copy paper in its secondary scanning direction when the copy paper is brought to the intermediate tray 35 after the image transfer process, and outputs a resultant signal to the CPU 63c. Based on this signal, the CPU 63c detects the image of the reference line and the leading edge of the copy paper from signal level variations that would occur when the detecting point shifts from the original surface of the copy paper to the reproduced reference line and when the leading edge of the copy paper passes the timing sensor 68.

The toner density sensor 70 is used for toner density adjustment. It detects the density of a toner image of the reference gray original member 17d formed on *the photosensitive drum 18 and outputs a resultant signal to the CPU 63c.

A memory 66c is provided for storing reference data to be used by the CPU 63c when calculating correction values in individual adjustment processes. Appropriate reference data is read out depending on which adjustment is being carried out.

The timer 65c counts a preset time period in synchronism with detection signals fed from the timing switch 15 or detection time intervals of the image density sensor 49, potential sensor 61, timing sensor 68 and toner density sensor 70.

Referring now to the flowchart of FIG. 12, operations to be performed in self-adjustment of the copying machine 1c of the third embodiment will be described in the following.

After the copying machine 1c has been set to self-adjustment mode by operating the mode select switch 64c in Step S50, the operation flow proceeds to Step S51 for sequentially adjusting luminous intensity of the tungsten halogen lamp 4, life-size magnification, leading edge timing and toner density.

Figure 13:
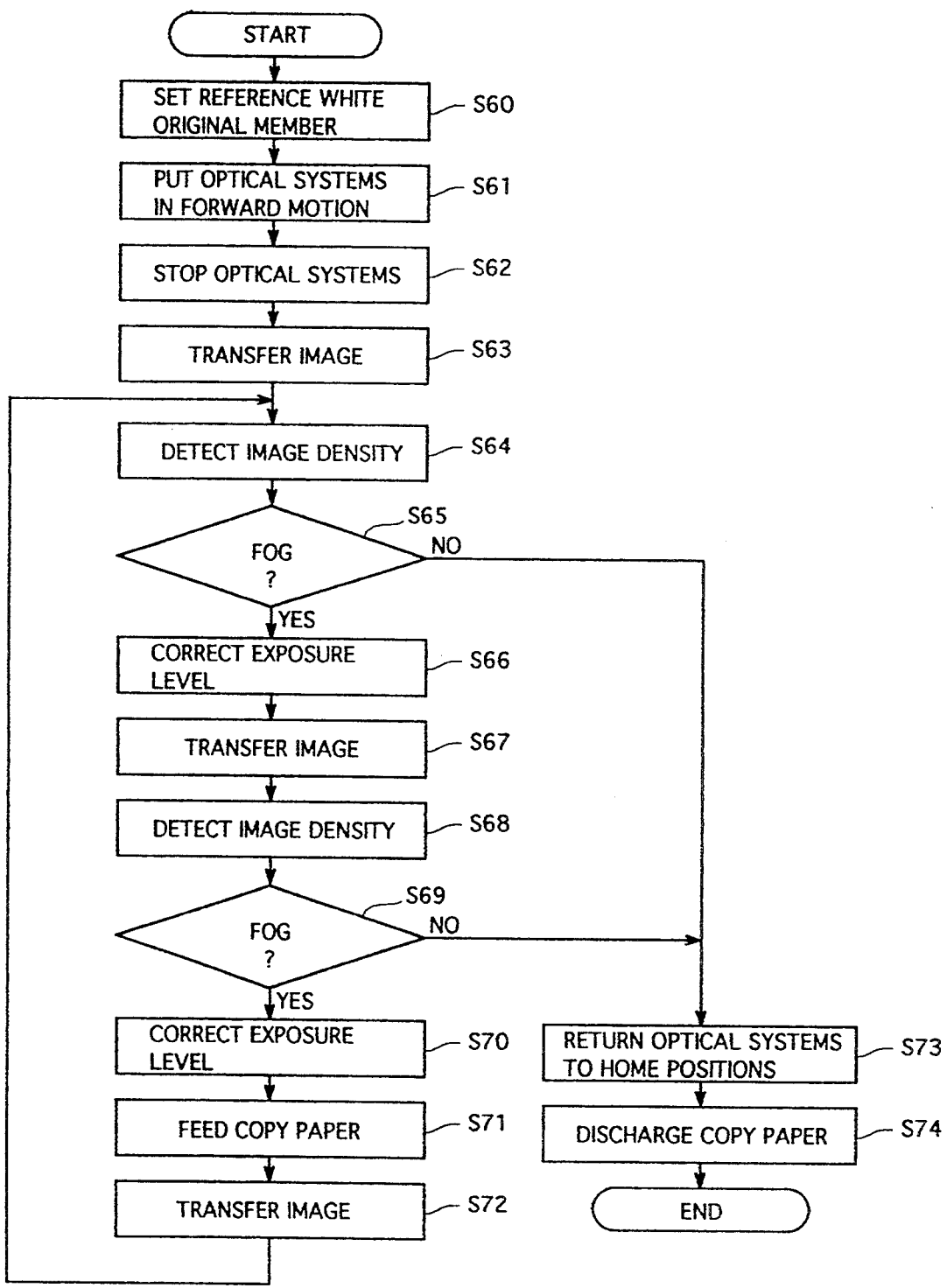
FIG. 13 is a flowchart showing detailed operations in luminous intensity adjustment step of the flowchart of FIG. 12.

In Step S51, luminous intensity of the tungsten halogen lamp 4 is adjusted according to the flowchart of FIG. 13. A detailed operation flow of luminous intensity adjustment will be first described in the following referring to FIG. 13.

First, the reference original carrier 56 is rotated to direct the reference white original member 17a to the reference original scanning window 60 (Step S60) and the first and second optical systems 11-12 starts their reciprocal movements (Step S61). When a preset time period has been counted by the timer 65c after the timing switch 15 detected the first optical system 11, forward movement of the first and second optical systems 11-12 is stopped (Step S62). Then, an image of the reference white original member 17a is reproduced on copy paper in Step S63 and the copy paper is carried down to the intermediate tray 35. While the tungsten halogen lamp 4 is extinguished upon completion of the image transfer process, the first and second optical systems 11-12 are kept in a stopped state.

When the copy paper is placed on the intermediate tray 35, the density detecting unit G is activated to detect image density across the copy paper in the main scanning direction (Step S64) and resultant image density data is outputted to the CPU 63c. The CPU 63c compares the measured density data with the optimum density data to determine whether the former falls within the predefined limits (Step S65). If the measured density data is within the limits, it is judged that there is no fog on the reproduced image and the operation flow proceeds to Step S73. Then, the first and second optical systems 11-12 are returned to their home positions (Step S73) and the copy paper on the intermediate tray 35 is discharged onto the copy paper receiving tray 30 (Step S74), where the sequence of image density adjustment is completed.

On the other hand, if the measured density data goes beyond the limits in Step S65, that is, there is fog on the copy paper, the operation flow proceeds to Step S66. In Step S66, the CPU 63c calculates a correction value for achieving appropriate image density based on the measured density data and adjusts exposure by increasing luminous intensity of the tungsten halogen lamp 4, for example, according to the correction value. At the same time, the corrected exposure value of the tungsten halogen lamp 4 or the correction value to be added to the exposure value is stored in the internal memory of the CPU 63c. Subsequently, the copy paper on the intermediate tray 35 is sent back to the image forming portion P, where an image of the reference white original member 17a is reproduced on the reverse side of the copy paper at a corrected exposure level (Step S67) and the copy paper is carried down to the intermediate tray 35 again. Image density is detected again (Step S68) to verify image density after correction of the exposure level (Step S69). If the image density data at the corrected exposure level is within the limits, the operation flow proceeds to Steps S73 and S74, where the sequence of image density adjustment is completed. Contrarily, if the image density data goes beyond the limits, the operation flow proceeds to Step S70, where the exposure level of the tungsten halogen lamp 4 is corrected again and the correction value is stored in the internal memory of the CPU 63c in a similar way as Step S66.

From Step S70, the operation flow proceeds to Step S71, where another sheet of copy paper is fed from the paper cassette 24. The previously supplied copy paper may be left on the intermediate tray 35 as it is at this point, or discharged before the new copy paper is supplied.

An image of the reference white original member 17a is reproduced again on the newly supplied copy paper at a corrected exposure level (Step S72) and the operation flow returns to Step S64, where image density is detected again.

When an appropriate exposure level of the tungsten halogen lamp 4 has finally been obtained (NO in Step S65 or S69), the operation flow proceeds to Steps S73 and S74, where the copy paper on the intermediate tray 35 is discharged onto the copy paper receiving tray 30 and the sequence of image density adjustment is completed.

Figure 12:
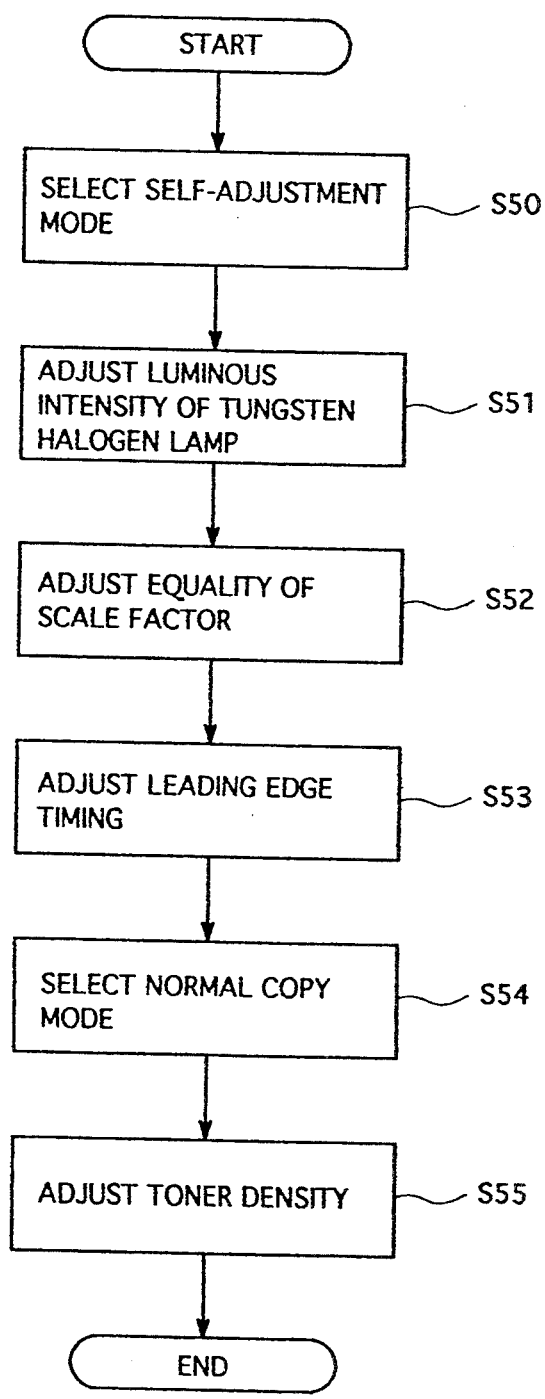
FIG. 12 is a flowchart showing a sequence of self-adjustment performed by the copying machine of the third embodiment.

Upon completion of luminous intensity adjustment of the tungsten halogen lamp 4, the operation flow proceeds to Step S52 of FIG. 12 for life-size magnification adjusting.

Figure 7:
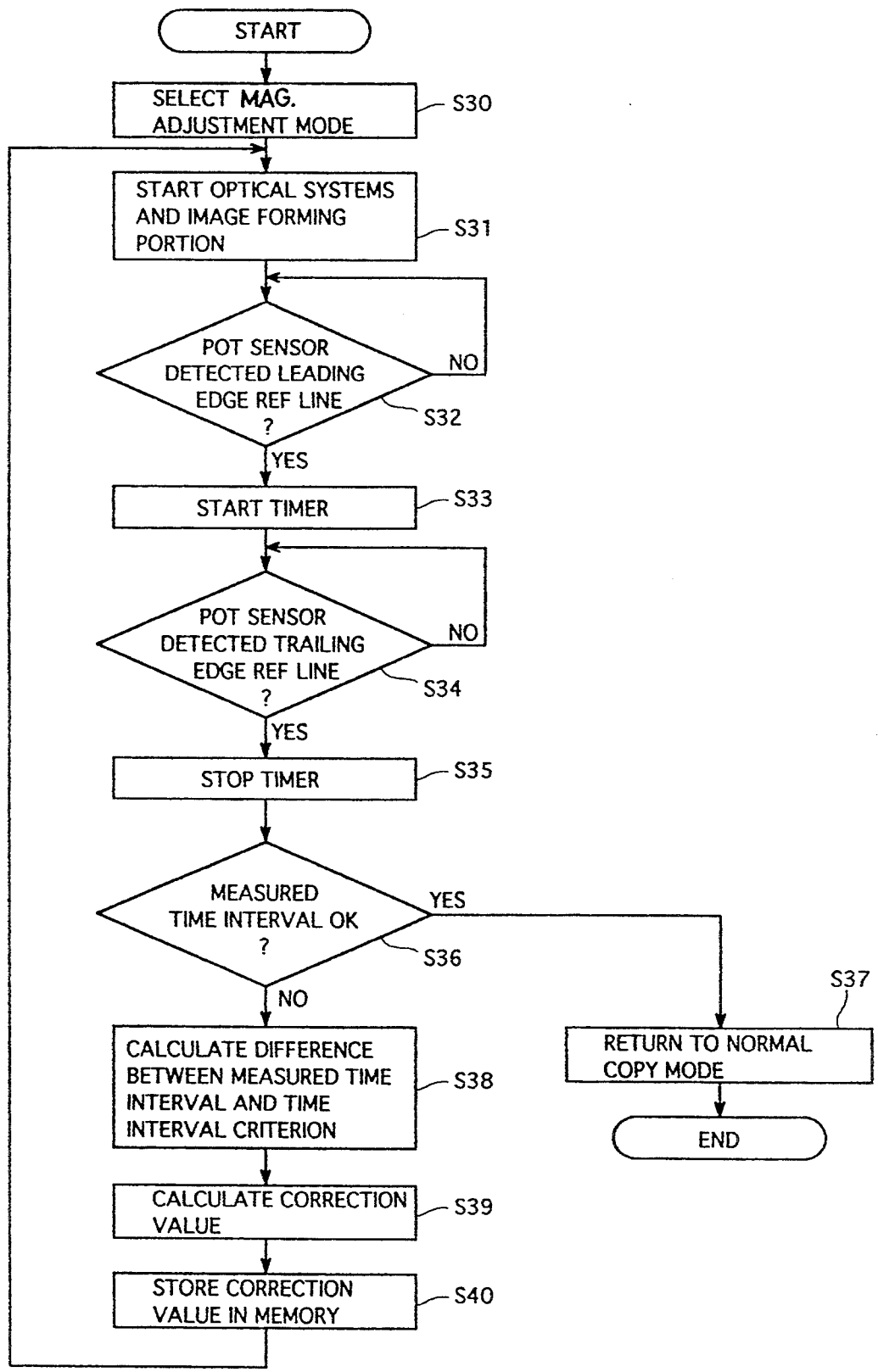
FIG. 7 is a flowchart showing a sequence of life-size magnification adjusting performed by the copying machine of the second embodiment.

Since the manner of operation of the copying machine 1c in life-size magnification adjusting of Step S52 is basically the same as shown in the flowchart of FIG. 7 for the second embodiment, the following description refers to their differences excluding small details.

When adjusting life-size magnification, the copying machine 1c causes the reference original 56 to rotate in Step S30 of FIG. 7 so that the leading edge reference line original member 17b is directed to the reference original scanning window 60. In executing life-size magnification adjusting, the copying machine 1c performs almost same operations as the second embodiment following Steps S31 through S40 of FIG. 7. When life-size magnification adjusting has been completed (YES in Step S36), however, the copying machine 1c escapes the routine of FIG. 7 without being reset to normal copy mode.

Following the process of life-size magnification adjusting, the operation flow proceeds to Step S53 of FIG. 12 for leading edge timing adjustment.

Figure 3:
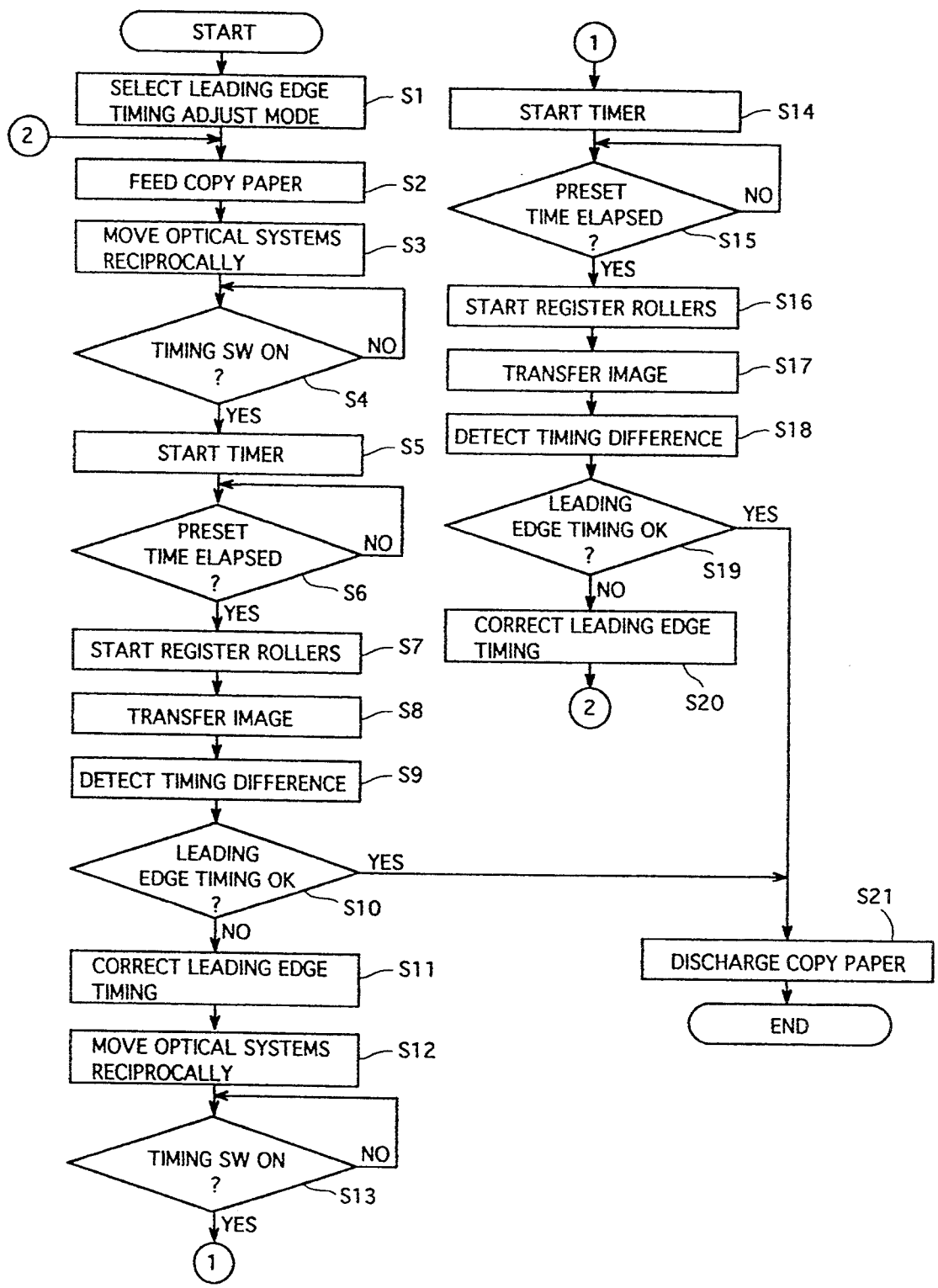
FIG. 3 is a flowchart showing a sequence of leading edge timing adjustment performed by the copying machine of the first embodiment.

Since the manner of operation of the copying machine 1c in leading edge timing adjustment of Step S53 is basically the same as shown in the flowchart of FIG. 3 for the first embodiment, the following description refers to their differences excluding small details.

When adjusting leading edge timing, the copying machine 1c causes the reference original carrier 56 to rotate in Step S1 of FIG. 3 so that the reference line original member 17c is directed to the reference original scanning window 60. Thereafter, the copying machine 1c performs almost same operations as the first embodiment following Steps S2 through S21 of FIG. 3 in executing leading edge timing adjustment.

Upon completion of leading edge timing adjustment, the copying machine 1c is returned to normal copy mode in Step S54 of FIG. 12 and performs toner density adjustment in Step S55.

The copying machine 1c is arranged to perform toner density adjustment constantly or each time a specified number of copies have been produced after completing adjustments of Steps S51 through S53. Referring now to the flow-chart of FIG. 14, toner density adjustment of Step S55 of FIG. 12 will be described below.

Following the commencement of toner density adjustment, the reference original carrier 56 is rotated to direct the reference gray original member 17d to the reference original scanning window 60 (Step S80) and the first and second optical systems 11–12 starts their reciprocal movements (Step S81). After the timing switch 15 has detected the first optical system 11, a preset time period is counted by the timer 65c. The toner density sensor 70 detects the density of a toner image formed on the photosensitive drum 18 during the same time period (Step S82) and outputs detected data to the CPU 63c. It is to be noted that the toner image of the reference gray original member 17d is picked up outside the secondary scanning range. This means that the toner image of the reference gray original member 17d, whatsoever formed on the photosensitive drum 18, will not be transferred onto the copy paper. This arrangement enables the toner density sensor 70 to detect the density of the toner image.

The CPU 63c compares the measured density data with the optimum density data stored in the memory 66c (Step S83). If the measured density data is higher than the optimum density data (NO in Step S83), it is judged that there is sufficient toner powder in the developing unit 20 and the operation flow of FIG. 14 is completed.

If, however, the measured density data is lower than the optimum density data, which means that the amount of toner powder in the developing unit 20 is insufficient (YES in Step S83), the operation flow proceeds to Step S84. In Step S84, the CPU 63c transmits a control signal to the drive controller 69 in order to replenish the developing unit 20 with toner powder stored in a toner hopper 62. This causes a toner feed roller (not illustrated) in the toner hopper 62 to rotate for a certain time. As a result, an appropriate amount of toner powder is supplied into the developing unit 20 and the operation flow of FIG. 14 is completed.

As seen above, the copying machine 1c of the third embodiment comprises a plurality of built-in reference original members 17a–17e and enables a series of adjustments to be performed automatically by simply selecting an appropriate operation mode. Unlike the conventional copying machines, the copying machine 1c no longer requires a plurality of dedicated reference original sheets to be prepared and placed one after another on the original glass plate 2 for conducting several adjustments. This will serve to improve not only the working efficiency in an adjustment process but also the accuracy of adjustment on copying machine production lines. Furthermore, it will become possible for service personnel to carry out on-site adjustments in a quick and accurate manner.

Although the copying machine 1c of the third embodiment has been described as being provided with the reference original carrier 56 carrying the reference original members 17a–17d for self-adjustment of luminous intensity of the tungsten halogen lamp 4, life-size magnification, leading edge timing and toner density, the combination of reference original members is not limited thereto. The reference original carrier 56 may carry other types of reference original members depending on what kinds of adjustments are required for the copying machine. Furthermore, the reference original members may be mounted in any order around the reference original carrier 56 depending on a desired sequence of self-adjustments.

Although the reference original carrier 56 so far described with reference to the third embodiment has a shape of a rectangular parallelepiped, it is not limited to that structure. In one variation, the reference original carrier 56 may have an increased number of side surfaces for carrying reference original members so that it can deal with additional adjustment items. In another variation, the copying machine 1c may comprise, instead of the reference original carrier 56 constructed as a ratable rectangular parallelepiped, a pair of rollers spaced from each other with their rotary shafts aligned in the main scanning direction and an endless belt member stretched between the rollers. In this variation, the belt member carries a plurality of reference original members arranged on its surface and is rotated around the rollers one of which is driven by a motor, for example.

In still another variation, the reference original members 17a–17d may be arranged side by side in the secondary scanning direction to form a flat surface all together to the left of the original glass plate 2 (e.g., between the home position switch 14 and original glass plate 2) instead of mounting on the side surfaces 58a–58d of the reference original carrier 56 provided that there is a sufficient space in the machine body.

In the above description of the third embodiment, there has been shown an example of a copying machine which sequentially performs luminous intensity adjustment of the tungsten halogen lamp 4, life-size magnification adjusting and leading edge timing adjustment when self-adjustment mode is selected by operating the mode select switch 64c followed by constant toner density adjustment. Instead of the mode select switch 64c, there may be provided a plurality of mode select switches so that the above adjustments can be individually executed whenever the need arises. Provided with such mode select switches, it would also be possible to preselect desired adjustment items so that they would automatically be executed each time the power is turned on or a specified number of copies have been produced or at regular intervals of elapsed time.

Although the invention has so far been described as being embodied in copying machines having the double-sided copying function, it is to be understood that the invention is applicable to copying machines or other types of image forming apparatuses having only the single-sided copying function.

What is claimed is:

1. An image forming apparatus comprising:
   an original placement portion:
   reference original means provided at an appropriate position outside of the original placement portion;
   scanning means capable of selectively scanning either the original placement portion or the reference original means;
   image forming means for forming an image based on a result of the scanning means;
   selection means for selecting the scanning of the original placement portion or the scanning of the reference original means; and
   reading means for reading an image of the reference original means formed by the image forming means to evaluate a performance of the image forming means;
   the image forming means including:
      a photosensitive body for producing a latent image based on a result of the scanning means;
      developing means for developing the latent image to a toner image;
      transferring means for transferring the toner image onto copy paper; and
      conveying means for conveying copy paper through the transferring means; and
   the reading means includes a detector provided on a downstream side of the transferring means for detecting the leading edge of copy paper carrying a toner image of the reference original means and the toner image:
      the image forming apparatus further comprising:
         memory means for storing a reference timing difference between the leading edge of copy paper and the reference original image;
         timing difference measuring means for measuring a timing difference between a detection of the leading edge of copy paper and a detection of the reference original image;
         offset value calculating means for calculating an offset value between the reference timing difference and the measured timing difference; and
         control means for controlling the conveying means to convey copy paper to the transferring means at such a timing as to correct an offset value calculated by the offset value calculating means.

2. An image forming apparatus according to claim 1 further comprising paper refeeding means for feeding the copy paper carrying the reference original image to the transferring means again, the detector being provided at an appropriate position on paper refeeding means, wherein the control means for controlling the paper refeeding means to refeed the copy paper at such a timing as to correct a calculated offset value.

3. An image forming apparatus comprising:
   an original placement portion;
   reference original means provided at an appropriate position outside of the original placement portion;
   scanning means capable of selectively scanning either the original placement portion or the reference original means;
   image forming means for forming an image based on a result of the scanning means;
   selection means for selecting the scanning of the original placement portion or the scanning of the reference original means; and
   reading means for reading an image of the reference original means formed by the image forming means to evaluate a performance of the image forming means;
   the image forming means including:
      a photosensitive body for producing a latent image based on a result of the scanning means; and
      magnification adjusting means for adjusting the magnification of latent image;
   the reference original means including:

a leading reference marker provided at a forward outside of a leading edge of the original placement portion; and a trailing reference marker provided at a backward outside of a trailing edge of the original placement portion:

the reading means including a detector for detecting a latent image of the leading reference marker and a latent image of the trailing reference marker;

the image forming apparatus further comprising:

memory means for storing a reference timing difference between the leading reference marker image and the trailing reference marker image in the life-size magnification;

timing difference measuring means for measuring a timing difference between a detection of the leading reference marker image and a detection of the trailing reference marker image in the life-size magnification; and correction value calculating means for calculating, based on the reference timing difference and the measured timing difference, a correction value for the magnification adjusting means to provide the true life-size magnification.

4. An image forming apparatus according to claim 3 wherein the magnification adjusting means includes drive means for driving the scanning means to scan at a specified speed.

5. An image forming apparatus according to claim 3 wherein the magnification adjusting means includes drive means for driving the photosensitive body to revolve at a specified speed.

6. An image forming apparatus comprising:
an original placement portion;
reference original means provided at an appropriate position outside of the original placement portion;
scanning means capable of selectively scanning either the original placement portion or the reference original means;
image forming means for forming an image based on a result of the scanning means;
selection means for selecting the scanning of the original placement portion or the scanning of the reference original means; and
reading means for reading an image of the reference original means formed by the image forming means to evaluate a performance of the image forming means;
the selection means having a plurality of adjusting modes in the scanning of the reference original means;
the reference original means including:
a rotary shaft aligned in a main scanning direction;
drive means for rotating the rotary shaft;
a block fixedly attached on the rotary shaft and having a plurality of side surfaces arranged in rotating directions, the plurality of side surfaces being respectively provided with different reference original members corresponding to the plurality of adjusting modes; and
control means for controlling the drive means to render the corresponding reference original member of the block face the scanning means in accordance with a selected adjusting mode.

7. An image forming apparatus according to claim 6 wherein the reference original means further comprising means for setting a sequence of adjusting modes for the control means.

8. An image forming apparatus according to claim 6 wherein one of the plurality of reference original members is a leading reference marker, further comprising a trailing reference marker provided at a backward outside position of the trailing edge of the original placement portion.

* * * * *